United States Patent Office 3,158,603
Patented Nov. 24, 1964

3,158,603
PROCESS FOR THE MANUFACTURE OF
2β,19-OXIDO-STEROIDS
Albert Wettstein, Riehen, and Georg Anner, Karl Heusler, and Jaroslav Kalvoda, Basel, Switzerland, assignors to Ciba Corporation, New York, N.Y., a corporation of Delaware
No Drawing. Filed Sept. 19, 1962, Ser. No. 224,846
Claims priority, application Switzerland, Sept. 22, 1961, 11,073/61; Aug. 31, 1962, 10,403/62
12 Claims. (Cl. 260—239.55)

Subject of the present invention is a process for the manufacture of 2β,19-oxido-5α-steroids starting from 19-unsubstituted 2β-hydroxy-5α-steroids. Said oxido-steroids can be used, for example, for the preparation of important 19-nor-steroids (anabolic progestative and estrogenic agents), such as derivatives of 19-nor-testosterone, 19-nor-progesterone, Δ¹-3-oxo-17β-hydroxy-19-nor-5α-androstene, the 3-desoxo derivatives thereof, or of estrone.

The process according to the present invention consists in reacting 19-unsubstituted 2β-hydroxy-5α-steroids with an oxidizing leadacylate in a solvent and, if desired, hydrolyzing and/or oxidizing the obtained 2β,19-oxido-5α-steroids.

The reaction occurring in the above said process may be represented, for example, by the following scheme of partial formulae:

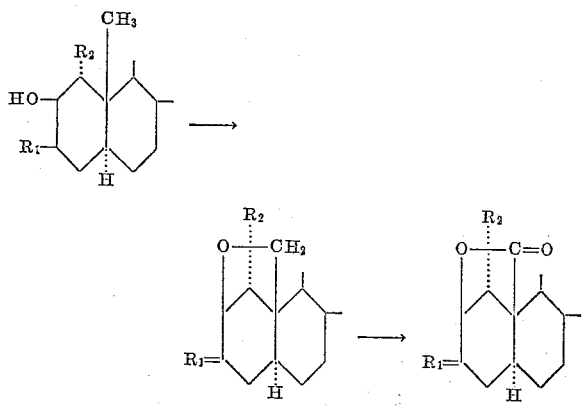

in which formulae R₁ represents two hydrogen atoms, a hydrogen atom together with an etherified or esterified hydroxyl group, or a ketalized oxo group and R₂ stands for a hydrogen or halogen atom or an etherified or esterified hydroxyl group, R₁ and R₂ taken together may also represent the radical of a dibasic acid or of a lower aliphatic or araliphatic diol.

For sake of simplicity of 5α-hydrogen atom is not mentioned in the following part of the description.

The starting materials for the present process are 2β-hydroxy-steroids of the androstane, pregnane, cholane, cholestane, stigmastane, spirostane and cardanolide series, which may contain in the ring system, especially in one or more of the positions 1, 3, 4, 6, 7, 8, 9, 11, 12, 14, 15, 16, 17, 20 and 21 further substituents, such as free or functionally converted oxo groups esterified or etherified hydroxyl groups, lower alkyl or alkenyl groups, e.g. methyl, ethyl, vinyl, or allyl groups, and/or halogen atoms. Functionally converted oxo groups are ketalized oxo groups or oxo groups converted into enol derivatives, e.g. enol ethers or enol esters. Furthermore the starting materials may contain double bonds or oxido groups for example in positions 9, 11 and/or 16, 17.

Valuable starting materials are, for example, such 2β-hydroxy-steroids which contain in position 3 and, if desired, also in position 1, the substituents R₁ and R₂ as indicated above; such substituents are suitable for the formation of the Δ¹-3-oxo-grouping after opening of the 2β,19-oxido bridge. There are particularly to be mentioned derivatives of 1α,2β,3α-trihydroxy-steroids, such as cyclic carbonates, sulfites, acetonides or benzal compounds, or especially 3-esters and 3-ethers of 2β,3-dihydroxy-1α-halogen-steroids or ketals of 3-oxo-2β-hydroxy-1α-halogen-steroids.

Specific starting materials are for example the following compounds:

2β-hydroxy-3β:17β-dibenzoyloxy-androstane,
2β-hydroxy-3β:17β-dibenzoyloxy-17α-methyl-androstane,
The cyclic 1:3-carbonate or the 1:3-acetonide of 1α:2β:3α-trihydroxy-17-oxo- and 17β-benzoyloxy-androstane,
1α-chloro-2β-hydroxy-3β:17β-dibenzoyloxy-androstane,
1α-bromo-2β-hydroxy-3β:17β-dibenzoyloxy- or didecanoyloxy-androstane,
1α-chloro-2β-hydroxy-3β:17β-dibenzoyloxy- or 1α-chloro-2β-hydroxy-3β-benzoyloxy-17β-acetoxy-17α-methyl-androstane,
The cyclic 1:3-carbonate or the 1:3-acetonide of 1α:2β:3α-trihydroxy-20-benzoyloxy-5α-pregnane, 2β-hydroxy-17β-acetoxy- or -hexahydrobenzoyloxy-5α-androstane or 2β-hydroxy-17β-acetoxy-17α-methyl-5α-androstane.

Said starting materials are known or, if new, can be prepared according to known methods.

Advantageously, the above-mentioned 1α-chloro-2β-hydroxy-3β-acyloxy compounds are prepared by reduction of the corresponding Δ¹-3-oxo-steroids by means of a complex-metal hydride, acylation of the hydroxyl group so formed, and then addition of hypochlorous acid onto the 1:2-double bond.

The cyclic 1:3-carbonate or the 1:3-acetonide used as starting material is prepared by benzoylating the above-mentioned Δ¹-3β-hydroxyl compound, which is itself obtainable by reduction of a Δ¹-3-oxo-steroid, and then converting the benzoate so obtained by chromatography on aluminum oxide into the corresponding Δ¹-3α-hydroxy-steroid in the manner described by Tamm and Albrecht (Helv. Chim. Acta. 42, 2177 (1960)). Epoxidation of the 1:2-double bond and the subsequent acid hydrolysis of the crude epoxide, yield the 1α:2β:3α-trihydroxy compound, which is converted into the desired acetonide by treatment with acetone in the presence of anhydrous copper sulfate, or into the corresponding cyclic carbonate by treatment with phosgene in the known manner.

The 19-nor-steroids unsubstituted at the 3-position, may be prepared from the 3-unsubstituted 2β-hydroxy compounds, obtainable by the catalytic reduction of the 2-ketones. Especially suitable 3-unsubstituted 2β-hydroxy compounds are 2β-hydroxy-17β-acetoxy- of hexahydrobenzoyloxy-androstane, 2β-hydroxy-17β-acetoxy-17α-methyl-androstane and 2β-hydroxy-spirostane. The 2-oxo-compounds can be prepared from the corresponding 3-oxo-steroids by methods known per se, e.g. by bromination in position 2, transformation of the resulting 2-bromo-3-ketone by heating with pyridine into the 2-pyridinium salt, oxidation of the latter according to Kröhnke to the nitrone, which can be hydrolyzed to the 2,3-dioxo-steroid. Treatment of the mentioned diketone with p-toluene-sulfonic acid chloride in pyridine leads to the 2-oxo-3-enol-tosylate, which can be smoothly hydrogenated to the 3-unsubstituted 2-ketone, or directly to the corresponding 2β-hydroxy-steroid.

The oxidizing leadacylates, used in the process of the invention, are for example leadtetraacylates, of which the acid component is derived, for example, of a lower aliphatic, cycloaliphatic, araliphatic, or aromatic carboxylic acid, such as acetic, propionic, trifluoroacetic, hexahydrobenzoic, phenylacetic or benzoic acid. There can also be used dialkyl leaddiacylates, such as diethyl lead diacetate, or anhydrides of meta leadacid with the above carboxylic acids, such as diacetoxy-leadoxide.

The process according to the present invention can be performed, for example, by heating the starting material, if desired, in the presence of a weak inorganic or organic base, such, for example, as alkaline earth metal carbonates, e.g. calcium, barium or strontium carbonate, or tertiary amines, e.g. pyridine, with an excess of the oxidizing lead acylate, preferably in a non-polar solvent which is inert to the oxidative agent, for example to the boiling point of the latter, preferably to a temperature above 60° C., and isolating the desired 2β,19-oxidosteroids according to known methods.

Particularly suitable solvents are aliphatic, cycloaliphatic or aromatic hydrocarbons, such as hexane, heptane, cyclohexane, methylcyclohexane, dimethylcyclohexane or benzene. The requisite time of reaction usually depends on the temperature, preferably a reaction time of 4 to 20 hours is necessary.

If desired, the oxygenated C-19-methyl group of 19-unsubstituted 2β,19-oxides can be further oxidized under more drastic conditions, which can be effected, for example, by using strong oxidation agents, such as ruthenium tetroxide or especially derivatives of hexavalent chromium, e.g. chromic acid or tertiary butyl chromate, in solvents, such as lower fatty acids, e.g. acetic or propionic acid, or chlorinated hydrocarbons, e.g. carbon tetrachloride, especially at an elevated temperature, such as between 50 and 100°. There are obtained 2,19-lactones of 2β-hydroxy-steroid-19-acids. The latter may be reduced, for example according to the process of U.S.A. patent application Ser. No. 180,029, filed March 15, 1962, by Albert Wettstein et al., with dialkyl-aluminumhydrides, such as diisobutyl aluminum-hydride at low temperature. The reduction products are 2β,19-oxido-19-hydroxy-compounds which are the cyclohemiacetals of 2β-hydroxy-19-oxo-steroids.

On the other hand, an acyloxy group present in a 2β,19-oxide obtained by the present process, for example in position 3 and 17 or 20, can be hydrolyzed and the resulting hydroxy compound oxidized to a 3-ketone, 3,17-diketone or 3,20-diketone.

The 2β,19-oxido steroids obtained according to the present invention can be transformed into pharmacologically active compounds, for example, as described in our copending application No. 224,854, filed September 19, 1962.

The compounds obtained according to the process of the present invention are especially saturated and unsaturated 2β,19-oxido-steroids of the androstane and pregnane series such, for example, as 3-hydroxy-1α-halogen- or -hydroxy-2β,19-oxido-androstanes and their esters, such as 3β,17β-dihydroxy-1α-chloro- or -bromo-2β,19-oxido-androstane, 3β-hydroxy-1α-chloro- or -bromo-2β,19-oxido-17-oxo-androstane, 3β,17β-dihydroxy-1α-chloro- or -bromo-2β,19-oxido-17α-alkyl-, such as -methyl- or -ethyl-androstane, 3β,17β-dihydroxy-1α-chloro- or bromo-2β,19-oxido-17α-alkenyl-androstanes, 3β,17β-dihydroxy-1α-chloro- or -bromo-2β,19-oxido-17α-ethinyl-androstane and the esters of these compounds, such as the 1,3-carbonate of the 1α,3α-dihydroxy-2β,19-oxido-17-oxo-androstane. There are also to be mentioned the compounds which correspond to those mentioned above and have a 3-oxo group instead of the 3-hydroxy group and their esters and also the 3-unsubstituted 2β,19-oxido-androstanes, such as 2β,19-oxido-17β-hydroxy-androstane, 2β,19-oxido-17β-hydroxy-17α-methyl-androstane or 2β,19-oxido-17-oxo-androstane, 2β,19-oxido-1α-halogen-androstanes, such as 2β,19-oxido-1α-chloro- or bromo-17-oxo-androstane, 2β,19-oxido-1α-chloro- or bromo-17β-hydroxy-androstane and the esters thereof. The present invention also comprises 3-hydroxy-1α-halogen- or hydroxy-2β,19-oxido-pregnanes and their esters, for example such as contain in 20-position a free or esterified hydroxyl group or a free or ketalized oxo group, especially 3β,20-dihydroxy-1α- chloro- or bromo-2β,19-oxido-pregnane, 3β-hydroxy-1α-chloro- or bromo-2β,19-oxido-20-oxo-pregnane, 3β,17α-dihydroxy - 1α - chloro- or bromo-2β,19-oxido-20-oxo-pregnane and the esters thereof such, for example, as the 1,3-carbonate of the 1α,3α-dihydroxy-2β,19-oxido-20-oxo-pregnane or the esters thereof; the corresponding 2β,19-oxido-pregnanes unsubstituted in position 3 or 3 and 1, and the esters of these compounds.

Especially valuable final products obtainable according to the process of the present invention are compounds of the Formulae I and II

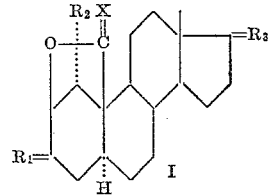

and

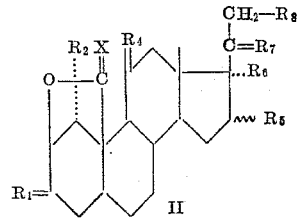

in which $R_1$ represents two hydrogen atoms, a hydrogen atom together with a free, esterified or etherified hydroxyl group, an oxo group or a lower alkylenedioxy group, $R_2$ stands for a hydrogen or halogen atom or a free esterified or etherified hydroxyl group, $R_1$ and $R_2$ when taken together may also represent the radical of a dibasic acid or a lower aliphatic or araliphatic diol, $R_3$ is an oxo group, a lower alkylenedioxy group or a hydrogen atom or a lower aliphatic hydrocarbon radical, such as an alkyl, alkenyl or alkinyl group, together with a β-positioned free esterified or etherified hydroxyl group, X represents two hydrogen atoms or an oxo group, $R_4$ stands for two hydrogen atoms, a hydrogen atom and a free or esterified hydroxyl group, or an oxo group, $R_5$ is a hydrogen atom, a methyl group or a free esterified or etherified hydroxyl group, $R_5$ and $R_6$ when taken together may also represent the radical of a lower aliphatic or araliphatic diol, $R_6$ and $R_8$ are hydrogen atoms or a free, esterified or etherified hydroxyl group and $R_7$ represents a hydrogen atom together with a free or esterified hydroxyl group, an oxo group or a lower alkylenedioxy group.

In the above mentioned esters the acyl radicals are especially such of aliphatic, cycloaliphatic, araliphatic and aromatic carboxylic acids with 1–15 carbon atoms, such as formic, methyl- or ethylcarbonic, acetic, trifluoroacetic, propionic, butyric, trimethylacetic, valeric, caproic, enanthic, decanoic, hexahydrobenzoic, cyclopentylpropionic, phenylpropionic or furanecarboxylic acid.

Etherified hydroxyl groups are for instance lower alkyloxy groups or the tetrahydro-pyranyloxy group.

The present invention also includes any variant of the present process in which only some of the process steps are carried out, if desired in a different order of succession, or in which an intermediate obtained at any stage of the process is used as starting material and any remaining steps are carried out.

The following examples illustrate the invention.

Example 1

100 mg. of 2β-hydroxy-17β-hexahydrobenzoxy-5α-androstane are added to a suspension, previously heated for a short time to 80° C., of 800 mg. of previously dried lead tetraacetate and 250 mg. of calcium carbonate in 100 ml. of cyclohexane. The reaction mixture is then refluxed for 16 hours, cooled, any inorganic constituents filtered off, the filtrate washed with 15 ml. of potassium iodide solution of 10% strength and with 15 ml. of a sodium thiosulfate solution of 10% strength, dried and evaporated in a water-jet vacuum. There are obtained 119 mg. of a crystalline crude product. This is chromatographed on alumina (activity II) to yield 70 mg. of pure 2β,19-oxido-17β-hexahydrobenzoxy-5α-androstane which, after being recrystallized from methanol, melts at 145–147° C. In the infrared spectrum there are absorption bands, inter alia at 5.81 μ, 8.53 μ, 8.83 μ, 9.80 μ, 9.92 μ and 11.45 μ. The nuclear magnetic resonance spectrum tallies with the above-mentioned structure of the compound. By further chromatography of the mother liquors and subsequent crystallization a small amount of the 3-oxo-17β-hexahydrobenzoyloxy-5α-androstane melting at 139–141° C. is obtained.

The 2β-hydroxy-17β-hexahydrobenzoyloxy-5α-androstane used as starting material is manufactured as follows:

3-oxo-17β-hexahydrobenzoyloxy-5α-androstane is brominated in dimethylformamide to give the corresponding 2-bromo-steroid melting at 175–176° C. Treatment of the latter compound for one hour at 100° C. with pyridine results in the formation of the 2-pyridinium salt (F. 300–302° C.), which is oxidized by p-nitroso-dimethylaniline to the corresponding nitrone (F. 198–199° C.). This compound can be hydrolyzed by treatment with diluted hydrochloric acid to the 2,3-dioxo-17β-hexahydrobenzoyloxy-5α-androstane (F. 218–219° C.). The resulting diketone forms a mixture of tosylates; the one melting at 179–182° C. is hydrogenated at 50° C. in ethanol using Raney nickel as catalyst to give the 2β-hydroxy-17β-hexahydrobenzoyloxy-5α-androstane melting at 179–180° C.

*Example 2*

50 mg. of 2β,19-oxido-17β-hexahydrobenzoxy-5α-androstane are treated in 2 ml. of glacial acetic acid for 30 minutes at 90° C. with a solution of 100 mg. of chromium (VI) oxide in 0.1 ml. of water and 0.68 ml. of glacial acetic acid. The cooled reaction mixture is then diluted with water and extracted with methylene chloride. The methylene chloride solution is washed in succession with water, saturated sodium bicarbonate solution and with water, dried and evaporated at a water-jet vacuum. One recrystallization of the crude product from a mixture of methylene chloride and petroleum ether yields 31 mg. of pure 2,19-lactone of 2β-hydroxy-17β-hexahydrobenzyloxy-5α-androstane-19-acid melting at 163–164° C.

*Example 3*

1 gram of previously dried lead tetraacetate, 350 mg. of barium carbonate and 100 mg. of 1-chloro-2β-hydroxy-3β,17β-dibenzoyloxy-5α-androstane in 30 ml. of benzene are refluxed for 16 hours with stirring. The cooled reaction solution is then filtered, the residue washed with about 60 ml. of benzene, the combined filtrates washed with a potassium iodide and sodium thiosulfate solution of 10% strength, dried and evaporated at a water-jet vacuum. The resulting crude product is chromatographed on thirty times its quantity of neutral alumina (activity II), 52 mg. of crude 1α-chloro-2β,19-oxido-3β,17β-dibenzoyloxy-androstane being obtained (characteristic infrared bands inter alia at 5.85 μ, 6.26 μ, 6.34 μ, 7.65μ, 8.95 μ and 11.44 μ).

The chlorohydrin used as starting material in the above-described reaction, is made in the following manner:

10.0 grams of Δ¹-3,17-dioxo-5α-androstane are dissolved in 100 cc. of absolute tetrahydrofurane and then stirred dropwise into a suspension of 5.0 grams of lithium-aluminum hydride in 200 cc. of tetrahydrofurane. The reaction mixture is boiled under reflux for 1 hour, then cooled, and the excess hydride is decomposed by the careful drop-wise addition of acetic acid, and, after adding the theoretical amount of water, the mixture is filtered. The filtrate is evaporated and yields 9.5 grams of Δ¹-3β,17β-dihydroxy-5α-androstene. A solution of this product in 80 cc. of pyridine is treated with 14.0 cc. of benzoyl chloride with cooling, and then allowed to stand for 16 hours at 20° C. 25 cc. of methanol are then added with cooling, and the reaction mixture is then concentrated under vacuum, the concentrate dissolved in ether, the ethereal solution shaken first with dilute hydrochloric acid, then with water and finally with a solution of sodium bicarbonate, dried and then evaporated under vacuum. 10.30 grams of crude Δ¹-3β,17β-dibenzoyloxy-5α-androstene are obtained, and may be purified by chromatographing on aluminum oxide.

The 7.0 grams of the dibenzoate so obtained are dissolved in 350 cc. of ether. 350 cc. of water and 6.5 grams of chloride of lime are then added, and the mixture is thoroughly shaken and then acidified with 4.0 cc. of glacial acetic acid. The mixture is then thoroughly stirred for 30 minutes, separated, and the ethereal solution is washed with a solution of sodium thiosulfate and then with water, then dried and finally evaporated. The residue is crystallized from ether/petroleum ether to yield 3.02 grams of 1α-chloro-2β-hydroxy-3β,17β-dibenzoyloxy-5α-androstane.

What is claimed is:

1. Process for the manufacture of 2β,19-oxido-steroids selected from the group consisting of andostanes and pregnanes, wherein a corresponding 19-unsubstituted 2β-hydroxy-5α-steroid is reacted with an acylate of tetravalent lead derived from a member selected from the group consisting of a lower aliphatic, lower cycloaliphatic, monocyclic carbocyclic aryl lower aliphatic and monocyclic carbocyclic aromatic carboxylic acid in an inert solvent.

2. Process as claimed in claim 1, wherein a lead-tetraacylate in which the acyl radical is derived from a member selected from the group consisting of a lower aliphatic, lower cycloaliphatic, monocyclic carbocyclic aryl lower aliphatic and monocyclic carbocyclic aromatic carboxylic acid, is used as acylate of tetravalent lead.

3. Process as claimed in claim 1, wherein a dialkyl leaddiacylate in which the acyl radical is derived from a member selected from the group consisting of a lower aliphatic, lower cycloaliphatic, monocyclic carbocyclic aryl lower aliphatic and monocyclic carbocyclic aromatic carboxylic acid, is used as acylate of tetravalent lead.

4. Process as claimed in claim 1, wherein a diacyloxy-leadoxide in which the acyl radical is derived from a member selected from the group consisting of a lower aliphatic, lower cycloaliphatic, monocyclic carbocyclic aryl lower aliphatic and monocyclic carbocyclic aromatic carboxylic acid, is used as acylate of tetravalent lead.

5. Process as claimed in claim 2, wherein leadtetra-acetate is used.

6. Process as claimed in claim 1, wherein the process is carried out in the presence of a member selected from the group consisting of a weak inorganic base and a weak organic base.

7. Process as claimed in claim 6, wherein a member selected from the group consisting of an alkaline earth metal carbonate and a tertiary amine is used.

8. Process as claimed in claim 1, wherein a member selected from the group consisting of an aliphatic, cyclo-aliphatic and aromatic hydrocarbon is used as inert solvent.

9. Process as claimed in claim 1, wherein the reaction is carried out at a temperature between 60° C. and 120° C.

10. Process according to claim 1, wherein the 19-unsubstituted 2β,19-oxido-steroids obtained are oxidized with a member selected from the group consisting of ruthenium tetroxide, chromium trioxide, chromic acid and tertiary butyl chromate.

11. Process as claimed in claim 1, wherein androstanes of the formula

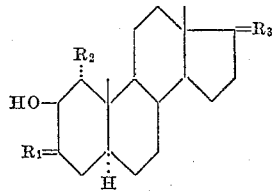

are used as starting material, in which $R_1$ represents a member selected from the group consisting of two hydrogen atoms, a hydrogen atom together with an etherified hydroxyl group, a hydrogen atom together with an esterified hydroxyl group and a ketalized oxo group, $R_2$ stands for a member selected from the group consisting of a hydrogen atom, a halogen atom, an etherified hydroxyl group and an esterified hydroxyl group, $R_1$ and $R_2$ taken together may also represent a hydrogen atom in 3β-position together with a member selected from the group consisting of carbonyldioxy, sulfinyldioxy, 2,2-propylidenedioxy and benzylidenedioxy and $R_3$ is a member selected from the group consisting of an oxo group, a ketalized oxo group, a hydrogen atom together with a β-positioned esterified hydroxyl group, a hydrogen atom together with a β-positioned etherified hydroxyl group, a lower aliphatic hydrocarbon radical together with a β-positioned esterified hydroxyl group and a lower aliphatic hydrocarbon radical toegther with a β-positioned etherified hydroxyl group.

12. Process as claimed in claim 1, wherein pregnanes of the formula

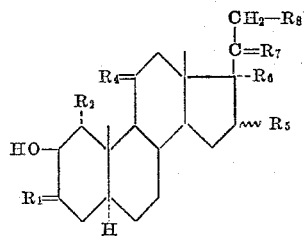

are used as starting material, in which $R_1$ represents a member selected from the group consisting of two hydrogen atoms, a hydrogen atom together with an esterified hydroxyl group, a hydrogen atom together with an etherified hydroxyl group and a ketalized oxo group, $R_2$ stands for a member selected from the group consisting of a hydrogen atom, a halogen atom, an esterified hydroxyl group and an etherified hydroxyl group, $R_1$ and $R_2$ taken together may also represent a hydrogen atom in the 3β-position together with a member selected from the group consisting of carbonyldioxy, sulfinyldioxy, 2,2-propylidenedioxy and benzylidenedioxy, $R_4$ stands for a member selected from the group consisting of two hydrogen atoms, a hydrogen atom together with an esterified hydroxyl group and an oxo group, $R_5$ is a member selected from the group consisting of a hydrogen atom, a methyl group, an esterified hydroxyl group and an etherified hydroxyl group, $R_5$ and $R_6$ when taken together may also represent a member selected from the group consisting of a oxido group, 2,2-propylidenedioxy and benzylidenedioxy each of $R_6$ and $R_8$ represents a member selected from the group consisting of a hydrogen atom and an esterified hydroxyl group and $R_7$ stands for a member selected from the group consisting of an oxo group, a ketalized oxo group and a hydrogen atom together with an esterified hydroxyl group.

No references cited.